US008638454B2

(12) United States Patent
Yamazaki

(10) Patent No.: US 8,638,454 B2
(45) Date of Patent: Jan. 28, 2014

(54) IMAGE FORMING APPARATUS HAVING A DETERMINATION SECTION

(75) Inventor: Masataka Yamazaki, Mie-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 637 days.

(21) Appl. No.: 12/748,978

(22) Filed: Mar. 29, 2010

(65) Prior Publication Data

US 2010/0302581 A1 Dec. 2, 2010

(30) Foreign Application Priority Data

May 27, 2009 (JP) ................................ 2009-128129

(51) Int. Cl.
*G06K 15/00* (2006.01)
*G03G 15/00* (2006.01)
*B41J 2/01* (2006.01)

(52) U.S. Cl.
USPC ........... 358/1.12; 399/364; 399/401; 347/104

(58) Field of Classification Search
USPC .................. 358/1.12; 399/364, 401; 347/104
See application file for complete search history.

(56) References Cited

U.S. PATENT DOCUMENTS 5,987,300 A * 11/1999 Mori ............................ 399/401
6,304,335 B1 * 10/2001 Furuya et al. ................ 358/1.15
6,353,717 B1 3/2002 Suzuki
6,362,870 B2 * 3/2002 Mui et al. ........................ 355/24
7,602,514 B2 * 10/2009 Levin et al. .................. 358/1.15
2007/0052998 A1 3/2007 Tsunekawa
2010/0157344 A1 * 6/2010 Ferlitsch ...................... 358/1.13

FOREIGN PATENT DOCUMENTS

JP 05-088480 A 4/1993
JP 6-24050 A 2/1994
JP 7-246739 A 9/1995
JP 8-52907 A 2/1996
JP 8-328320 A 12/1996
JP 9-244510 A 9/1997
JP 11-133678 A 5/1999
JP 11-160919 A 6/1999
JP 11-284818 A 10/1999

(Continued)

OTHER PUBLICATIONS

Japanese Official Action dated Apr. 19, 2011 together with English language translation from JP 2009-128129.

(Continued)

*Primary Examiner* — Fred Guillermety
(74) *Attorney, Agent, or Firm* — Scully, Scott, Murphy & Presser, PC

(57) ABSTRACT

An image forming apparatus is provided. The image forming apparatus includes a reading section configured to read an original document, a printing section configured to perform duplex printing including printing N sheets on first sides thereof and subsequently printing M sheets on second sides thereof when printing an image of the original document read by the reading section, wherein M is equal to or smaller than N, a determination section configured to calculate a preparation time required to generate print data based on a copy setting which affects the preparation time, and configured to determine the value of N, wherein the determination section determines a smaller value as the value of N, as the preparation time is longer, and a control section configured to control the printing section to perform the duplex printing in accordance with the value of N determined by the determination section.

9 Claims, 11 Drawing Sheets

| | DEFINITION DESCRIPTION | COEFFICIENT, TIME, AND THE LIKE |
|---|---|---|
| Tint | INITIAL VALUE OF PREPARATION TIME | 5sec |
| R2 | TIME COEFFICIENT FOR 2IN1 READING | 2 |
| R4 | TIME COEFFICIENT FOR 4IN1 READING | 4 |
| Rp | TIME COEFFICIENT FOR PICTURE QUALITY READING | 2 |
| Rd | TIME COEFFICIENT FOR DOUBLE-SIDE READING | 2 |
| Rc | TIME COEFFICIENT FOR COLOR READING | 1.2 |
| Th | THRESHOLD VALUE AT N=2 | 8sec |

(56) References Cited

FOREIGN PATENT DOCUMENTS

| | | | |
|---|---|---|---|
| JP | 2001-134142 | A | 5/2001 |
| JP | 2003-011473 | A | 1/2003 |
| JP | 2003-274081 | A | 9/2003 |
| JP | 2004-054086 | A | 2/2004 |
| JP | 2004-234106 | A | 8/2004 |
| JP | 2004-347627 | A | 12/2004 |
| JP | 2007-069357 | A | 3/2007 |
| JP | 2008-064943 | A | 3/2008 |
| JP | 2008-102204 | A | 5/2008 |

OTHER PUBLICATIONS

Chinese Office Action dated May 30, 2012 from related Chinese Application No. 201010147579.6, together with an English language translation.

* cited by examiner

FIG. 9

| | DEFINITION DESCRIPTION | COEFFICIENT, TIME, AND THE LIKE |
|---|---|---|
| Tint | INITIAL VALUE OF PREPARATION TIME | 5sec |
| R2 | TIME COEFFICIENT FOR 2IN1 READING | 2 |
| R4 | TIME COEFFICIENT FOR 4IN1 READING | 4 |
| Rp | TIME COEFFICIENT FOR PICTURE QUALITY READING | 2 |
| Rd | TIME COEFFICIENT FOR DOUBLE-SIDE READING | 2 |
| Rc | TIME COEFFICIENT FOR COLOR READING | 1. 2 |
| Th | THRESHOLD VALUE AT N=2 | 8sec |

IMAGE FORMING APPARATUS HAVING A DETERMINATION SECTION

CROSS-REFERENCE TO RELATED APPLICATION

This application claims priority from Japanese Patent Application No. 2009-128129, filed on May 27, 2009, the entire subject matter of which is incorporated herein by reference.

TECHNICAL FIELD

Aspects of the present invention relate to an image forming apparatus capable of duplex printing, and more particularly, to an image forming apparatus capable of duplex printing by printing a plurality of sheets on first sides thereof and subsequently printing the sheets on second sides thereof.

BACKGROUND

There has been proposed a technique for improving a speed of the duplex printing process by printing N sheets (N is a positive integer) on the first sides thereof and subsequently printing M sheets (M is an integer equal to or more than 0 and equal to or less than N) on the second sides thereof. For example, for performing the duplex printing on 10 pages (5 sheets), an image forming apparatus prints them in the page order of 2 (even page), 4 (even page), 1 (odd page), 6 (even page), 3 (odd page), 8 (even page), 5 (odd page), 10 (even page), 7 (odd page) and 9 (odd page). Furthermore, an image forming apparatus that prints them in the page order of 1, 3, 5, 2, 7, 4, 9, 6, 8, and 10.

However, in the above-described duplex printing technique, there have been the following problems. That is, a time required for completing generation of print data for "one printing process unit" (for example, one page) is different for each copy setting. For example, a setting for printing a plurality of pages on one sheet or setting for reading both sides requires a longer time for completing a reading of an original image, as compared with other settings. Therefore, even though a printing speed is increased by increasing the number of sheets to be successively printed on the first sides thereof, generation of the print data for subsequent "one printing process unit" may not be completed before a certain printing operation of "one printing process unit" is completed. Therefore, the printing operation may be temporarily suspended. In that case, the advantage of printing successively on first sides can be not fully enjoyed. Additionally, as the plurality of sheets are printed on the first sides thereof, the number of sheets staying in the image forming apparatus increases. Therefore, there may be a disadvantage in that the number of defective print sheets increases, which are caused by a sheet jam.

SUMMARY

Accordingly, it is an aspect of the present invention to provide an image forming apparatus capable of efficiently performing the duplex printing while reducing a possibility of the temporary suspension of the printing operation.

According to an illustrative embodiment of the present invention, there is provided an image forming apparatus comprising: a reading section configured to read an original document; a printing section configured to perform duplex printing including printing N sheets on first sides thereof and subsequently printing M sheets on second sides thereof when printing an image of the original document read by the reading section, wherein M is equal to or smaller than N; a determination section configured to calculate a preparation time required to generate print data based on a copy setting which affects the preparation time, and configured to determine the value of N, wherein the determination section determines a smaller value as the value of N, as the preparation time is longer; and a control section configured to control the printing section to perform the duplex printing in accordance with the value of N determined by the determination section.

According to another illustrative embodiment of the present invention, there is provided an image forming apparatus comprising: a reading section configured to read an original document; an operation section configured to allow a user input regarding an image reading setting of the reading section; a printing section configured to perform duplex printing including printing N sheets on first sides thereof and subsequently printing M sheets on second sides thereof when printing an image of the original document read by the reading section, wherein M is equal to or smaller than N; a determination section configured to determine the value of N based on the image reading setting; and a control section configured to control the printing section to perform the duplex printing in accordance with the value of N determined by the determination section.

According to a further illustrative embodiment of the present invention, there is provided an image forming apparatus comprising: a reading section configured to read an original document in a reading mode selected from a first mode of reading an image of the original document while conveying the original document and second mode of reading an image of the original document placed on a document placing table; a printing section configured to perform duplex printing including printing N sheets on first sides thereof and subsequently printing M sheets on second sides thereof when printing the image of the original document read by the reading section, wherein M is equal to or smaller than N; a determination section configured to determines the value of N at least based on the reading mode of the reading section; and a control section configured to control the printing section to perform the duplex printing in accordance with the value of N determined by the determination section.

According to the above-described illustrative embodiments, it is possible to provide the image forming apparatus which is capable of efficiently performing duplex printing while reducing the possibility of the temporary suspension of the printing operation.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 9 is a diagram illustrating an example of a definition table;

DETAILED DESCRIPTION

Hereinafter, an image forming apparatus according to an illustrative embodiment of the present invention will be described in detail with reference to the accompanying drawings. In the illustrative embodiment, there will be described an electrophotographic color printer as an example of the image forming apparatus. The color printer is capable of duplex printing by printing a plurality of sheets on the first sides thereof and subsequently printing the sheets on the second sides thereof.

Overall Configuration of Printer

Figure 1:
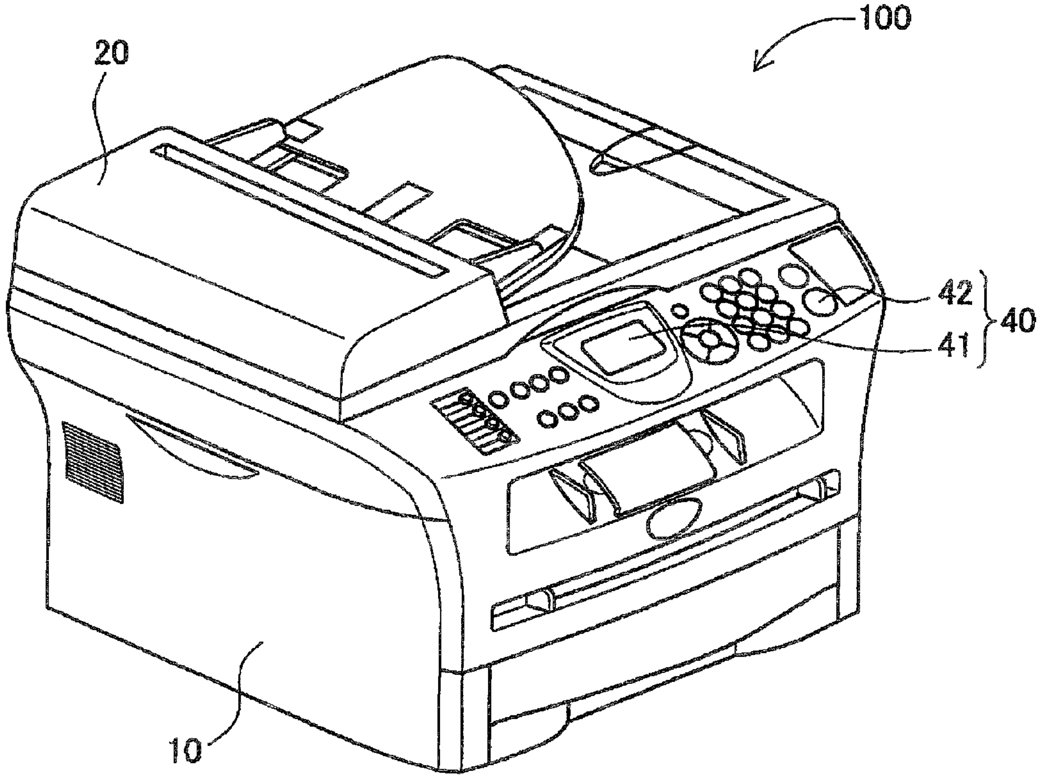
FIG. 1 is a perspective view illustrating a schematic configuration of a printer according to an illustrative embodiment.

As shown in FIG. 1, a printer 100 according to an illustrative embodiment includes an image forming section 10 that forms an image on a sheet and an image reading section 20 that reads an image of an original document. On the front side of the image reading section 20, there is provided an operation panel 40 including a display section 41 that is configured as a liquid crystal display, and a button group 42 that includes a start key, a stop key, a numeric keypad, and the like. The operation panel 40 is configured to display an operation status of the printer 100 and allow a user to perform an input operation.

Configuration of Image Reading Section

Figure 2:
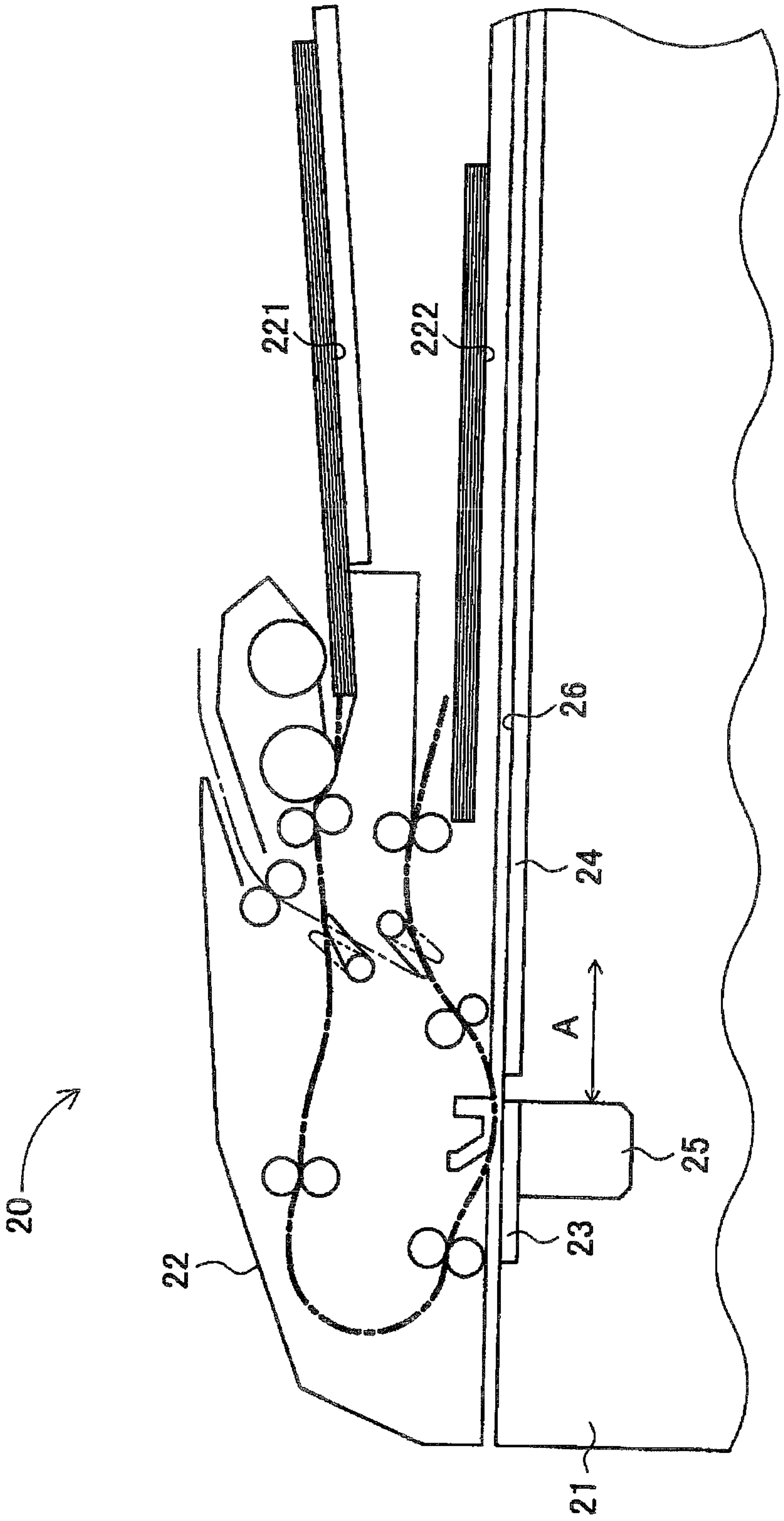
FIG. 2 is a conceptual diagram illustrating an internal configuration of an image reading section of the printer shown in FIG. 1.

As shown in FIG. 2, the image reading section 20 includes a scanner section 21 that reads an image of an original document and an Auto Document Feeder (ADF) 22 that automatically feeds the original document. The scanner section 21 includes transparent platen glasses 23 and 24 provided on the upper side thereof and an image sensor 25 provided thereinside. The ADF 22 includes an original document tray 221 and a sheet discharging tray 222. In the ADF 22, there is provided a document conveying path including a plurality of conveying rollers. Further, the ADF 22 has a double-side reading function, and includes switch-back rollers and various flaps for changing the conveying path.

The image reading section 20 has two modes of reading the original document, which include a flatbed mode, in which an original document is stationary during scanning and an ADF mode, in which an original document is moved during scanning. In the flatbed mode, the original document is placed one by one on the platen glass 24 (hereinafter referred to as a "FB glass 24"). In this sate, the image sensor 25 is moved in a sub-scanning direction, which is orthogonal to a main scanning direction, and which is shown as arrow A in FIG. 2, and at this time, the image of the original document is read on a line by line basis in the main scanning direction. On the other hand, in the ADF mode, the original document is collectively placed on the original document tray 221. Then, the image sensor 25 is moved to a position opposing the platen glass 23 (hereinafter referred to as an "ADF glass 23"), and is caused to be stationary. In this state, the original document is conveyed to a position opposing the ADF glass 23 (a reading position), and at this time, the image of the original document is read on a line by line basis in the main scanning direction. The original document after the reading is discharged to the sheet discharging tray 222.

Configuration of Image Forming Section of Printer

Figure 3:
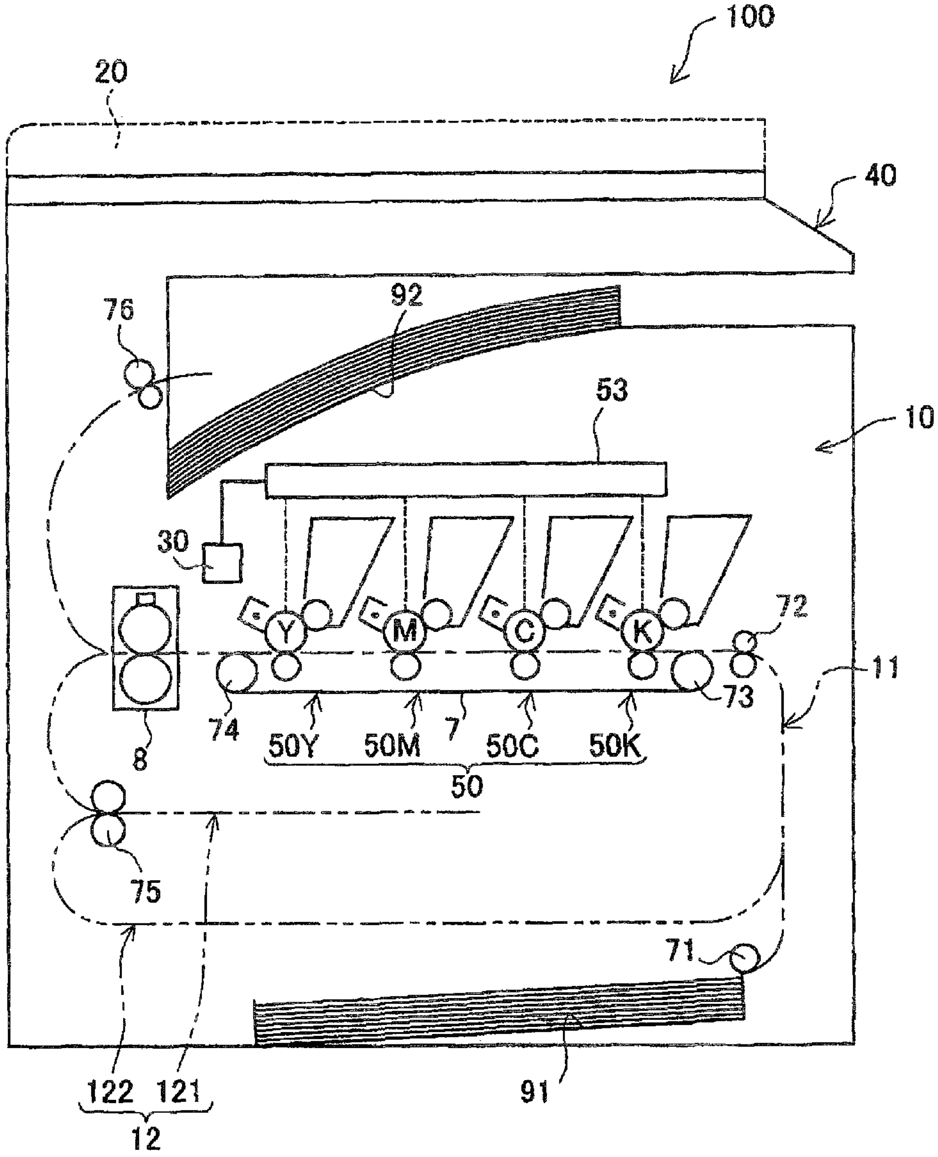
FIG. 3 is a conceptual diagram illustrating an internal configuration of an image forming section of the printer shown in FIG. 1.

As shown in FIG. 3, the image forming section 10 includes a processing section 50 that forms a toner image and transfers the toner image on a sheet, a fixing unit 8 that fixes the unfixed toner on the sheet, a sheet feeding cassette 91 that accommodates sheets on which an image has not been formed yet, and a sheet discharging tray 92 that receives sheets on which an image has been formed. Further, in the image forming section 10, a substantially S-shaped conveying path 11 (the chain line shown in FIG. 3) is provided. Along the conveying path 11, a sheet accommodated in the sheet feeding cassette 91 which is located on the bottom portion of the image forming section 10 is passed through a sheet feeding roller 71, the processing section 50, and the fixing unit 8, and is discharged by a sheet discharging roller 76 to the sheet discharging tray 92 which is located on the upper portion of the image forming section 10.

The processing section 50 is capable of forming a color image, and includes four processing units corresponding to the respective colors of yellow (Y), magenta (M), cyan (C), and black (K) which are arranged in parallel. Specifically, the processing section 50 includes a processing unit 50Y that forms a yellow (Y) image, a processing unit 50M that forms a magenta (M) image, a processing unit 50C that forms a cyan (C) image, and a processing unit 50K that forms a black (K) image. The processing section 50 further includes an exposure unit 53 that illuminates light on the respective processing units 50Y, 50M, 50C, and 50K, and a conveying belt 7 that is looped between the rollers 73 and 74 and that conveys a sheet to the transfer positions of the respective processing units 50Y, 50M, 50C, and 50K. Each of the processing units 50K, 50Y, 50M, and 50C is configured to form a toner image by an electrophotographic method.

The image forming section 10 feeds the sheets accommodated on the sheet feeding cassette 91 one by one, conveys the fed sheet to the processing section 50, and transfers the toner images formed by the processing section 50 onto the sheet. Furthermore, the sheet onto which the toner images are transferred is conveyed into the fixing unit 8, and the toner images are thermally fixed on the sheet. Then, the fixed sheet is discharged to the sheet discharging tray 92.

Furthermore, the image forming section 10 has a duplex printing mechanism that prints both sides (first side and second side) of a sheet. As shown in FIG. 3, a conveying path 12 (the chain double-dashed line in FIG. 3) is used for reversing the sheet and conveying the sheet again to the processing section 50 so as to perform printing on the back side (the second side) of the sheet printed on one side (the first side). The conveying path 12 branches from the conveying path 11 at a position at a downstream side from the fixing unit 8 in a sheet conveying direction. The conveying path 12 includes a conveying path 121 (hereinafter referred to as a "temporary staying path 121") for temporarily allowing the sheet to stay in order to reverse the sheet conveying direction and a conveying path 122 (hereinafter referred to as a "returning path 122") for returning the reversed sheet to the conveying path 11.

Specifically, in the duplex printing performed by the image forming section 10, the sheet is reversed in the following procedure. First, the sheet which is passed through the conveying path 11 (hereinafter referred to as a "forward conveying path 11") and has an image formed on the first side thereof, is thermally fixed by the fixing unit 8, and is subsequently sent to the conveying path 12 (hereinafter referred to as a "reverse conveying path 12"). Then, the sheet is conveyed into the temporary staying path 121, and the conveyance of the sheet is temporarily suspended. Thereafter, by turning the rotation direction of the turning roller 75, the sheet conveying direction is reversed, and the sheet is conveyed into the returning path 122. Then, the sheet is returned to the forward conveying path 11 at an upstream side from the processing section 50. Accordingly, the sheet is reversed, and an image is formed on the second side.

The image forming section 10 has a function of successively printing N sheets (N is a positive integer) on the first sides thereof and subsequently printing M sheets (M is an integer equal to or more than 0 and equal to or less than N) on the second sides thereof at the time of performing the duplex printing. Furthermore, the image forming section 10 has a function of changing the number of sheets N and the number of sheets M to be successively printed. The change of N and M is performed by adjusting the timing of sheet conveyance and the conveying speed. The number of sheets N to be successively printed is appropriately set by the double-side copying process to be described later.

Figure 4:
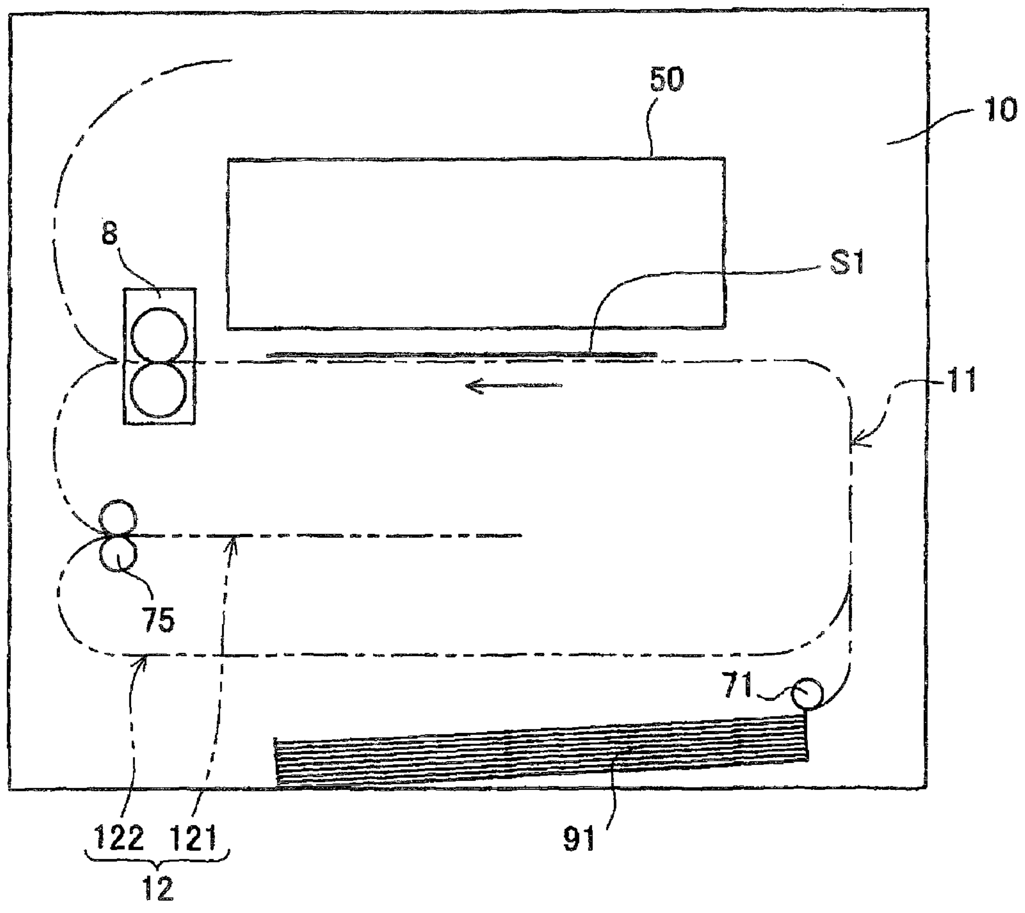
FIG. 4 is a first diagram illustrating a sheet conveying procedure of the duplex printing for the case where the number of sheets to be successively printed on the first sides is 2.
Figure 5:
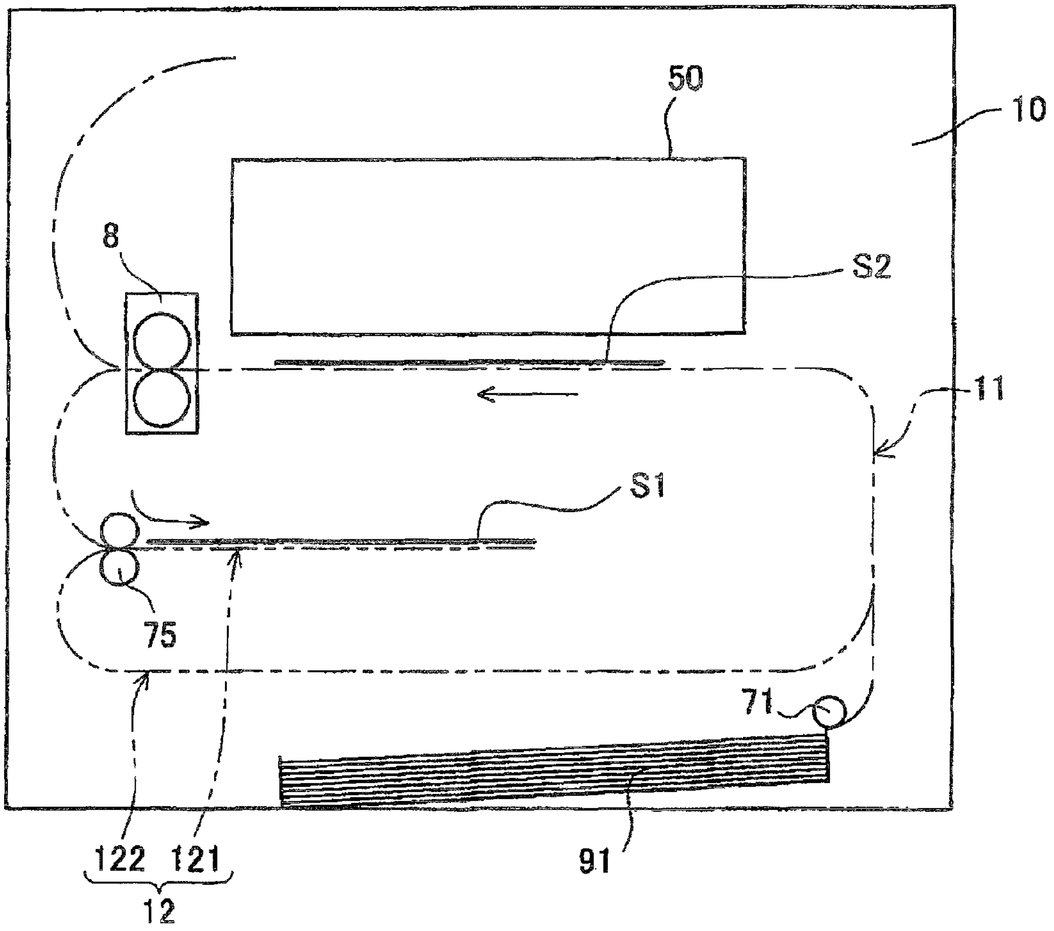
FIG. 5 is a second diagram illustrating the sheet conveying procedure of the duplex printing for the case where the number of sheets to be successively printed on the first sides is 2.

For example, when the number of sheets N to be successively printed is 2, the sheets are conveyed in the following procedure. First, as shown in FIG. 4, the first sheet S1 is conveyed into the forward conveying path 11, and is printed on the first side thereof by the processing section 50 (step 1). Next, as shown in FIG. 5, while the sheet S1 is conveyed into the reverse conveying path 12, the second sheet S2 is conveyed into the forward conveying path 11, and is printed on the first side thereof by the processing section 50 (step 2). Then, while the sheet S2 is conveyed into the reverse conveying path 12, the sheet S1 is returned to the forward conveying path 11, and is printed on the second side thereof by the processing section 50 (step 3). Subsequently, while the sheet S1 is discharged to the sheet discharging tray 92, the sheet S2 is returned to the forward conveying path 11, and is printed on the second side thereof by the processing section 50 (step 4). Consequently, the printing is performed in order of the first side of the first sheet, the first side of the second sheet, the second side of the first sheet, and the second side of the second sheet. In this procedure, during the reversing of a sheet (the first sheet), the printing is performed on another sheet (the second sheet). Accordingly, since printing of the second sheet is performed while waiting for the reversing of the first sheet, the standby time of the processing section 50 becomes shorter as compared with the case where the printing is performed on a sheet in order of the first side and second side on a sheet-by-sheet basis, so that printing efficiency can be improved.

Figure 6:
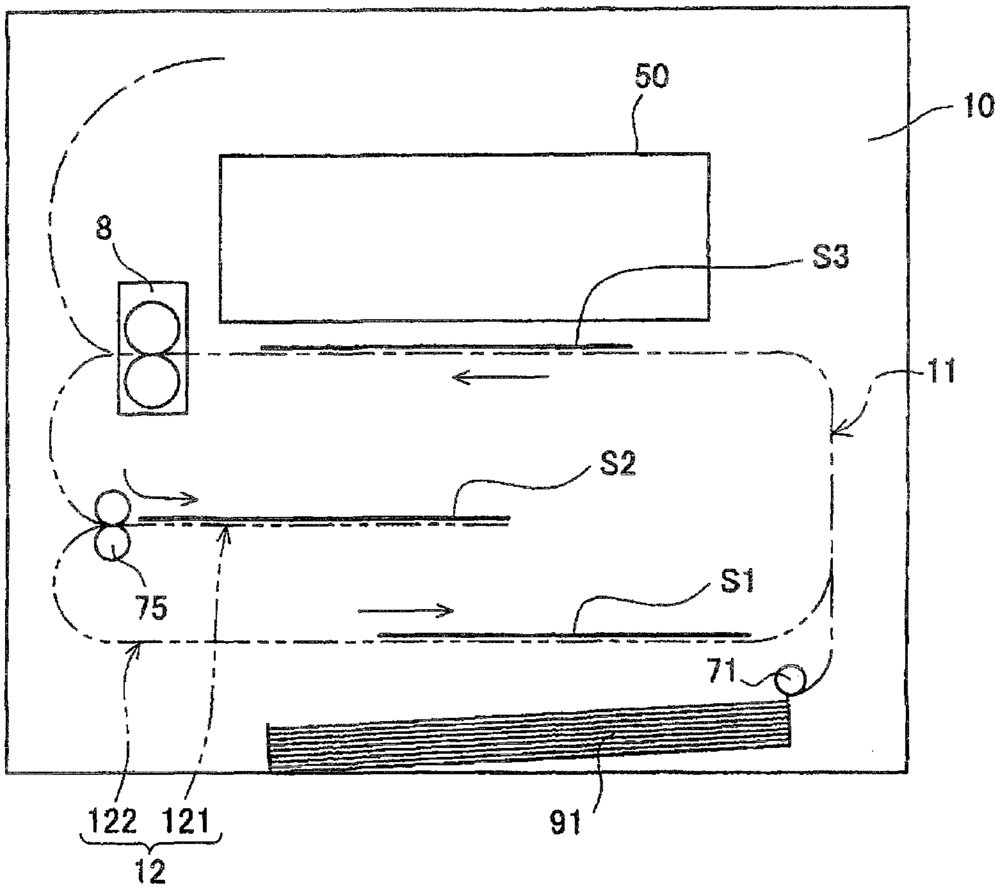
FIG. 6 is a diagram illustrating a sheet conveying procedure of the duplex printing for the case where the number of sheets to be successively printed on the first sides is 3.

Further, for example, when the number of sheets N to be successively printed is 3, the sheets are conveyed in the following procedure. First, the first sheet S1 is conveyed into the forward conveying path 11, and is printed on the first side thereof. Next, while the sheet S1 is conveyed into the temporary staying path 121, the second sheet S2 is conveyed into the forward conveying path 11, and is printed on the first side thereof. Subsequently, as shown in FIG. 6, the sheet S1 is conveyed into the returning path 122, the sheet S2 is conveyed into the temporary staying path 121, and the third sheet S3 is conveyed into the forward conveying path 11. Then, the sheet S3 is printed on the first side thereof. In this step, the sheet S1 is caused to stay in the reverse conveying path 12 (being conveyed in the reverse conveying path 12), and is not returned to the forward conveying path 11. That is, two sheets are staying in the reverse conveying path 12. Thereafter, in order of the sheets S1, S2, and S3, the sheets are returned to the forward conveying path 11, and are printed on the second sides thereof. Consequently, the printing is performed in order of the first side of the first sheet, the first side of the second sheet, the first side of the third sheet, the second side of the first sheet, the second side of the second sheet, and the second side of the third sheet. This conveying order allows the standby time of the processing section 50 to be further shorter as compared with the case where the number of sheets N to be successively printed is 2, so that printing efficiency can be improved further.

It is noted that the maximum number of sheets N to be successively printed is different depending on the number of sheets capable of staying in the reverse conveying path 12. The number of sheets capable of staying in the reverse conveying path 12 depends on the length of the reverse conveying path 12, the length of the sheet in the sheet conveying direction, and the like. That is, the number of sheets N to be successively printed is not limited to 2 or 3 described above, but may be 4 or more.

Electric Configuration of Printer

Figure 7:
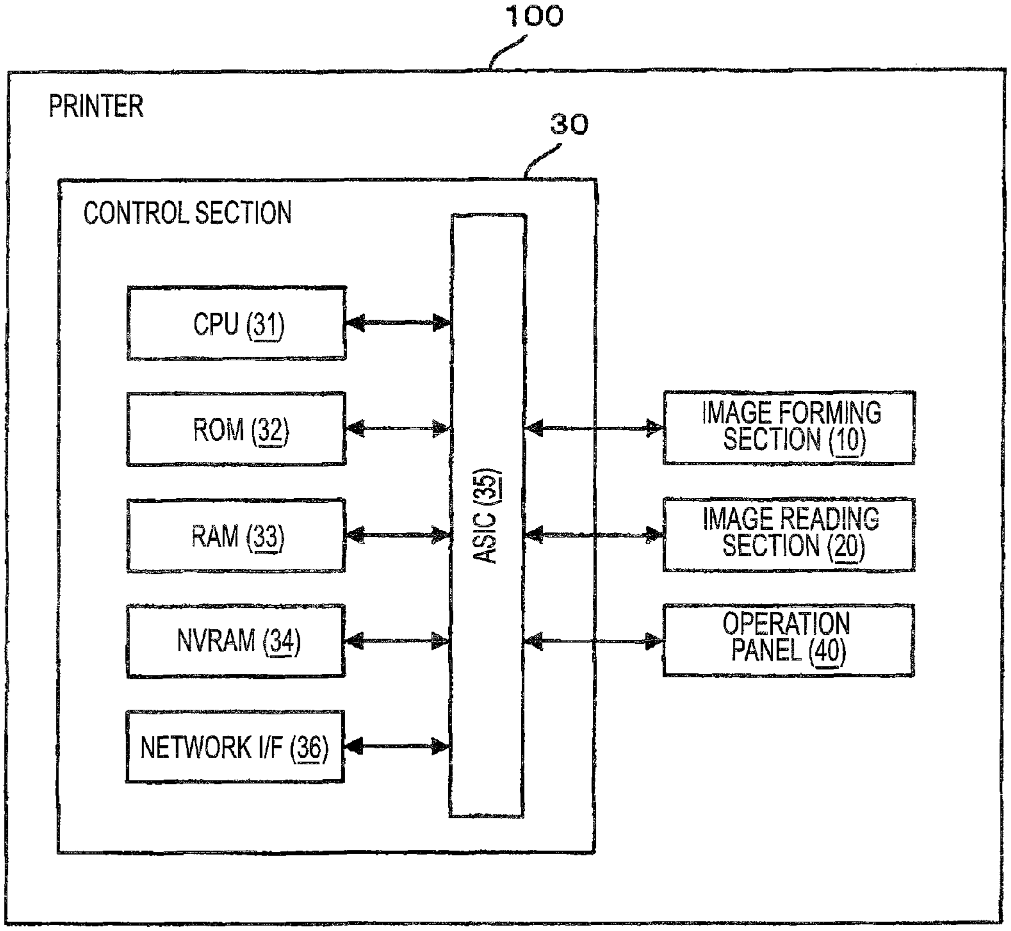
FIG. 7 is a block diagram illustrating an electric configuration of the printer.

Subsequently, an electric configuration of the printer 100 will be described. As shown in FIG. 7, the printer 100 includes a control section 30. The control section 30 includes a Central Processing Unit (CPU) 31, a Read Only Memory (ROM) 32, a Random Access Memory (RAM) 33, a nonvolatile RAM (NVRAM) 34, an Application Specific Integrated Circuit (ASIC) 35, and a network interface 36. Furthermore, the control section 30 is electrically connected to the image forming section 10, the image reading section 20, and the operation panel 40.

The ROM 32 stores various control programs and various settings for controlling the printer 100, initial values, and the like. The RAM 33 is used as a work area, from which the various control programs are read, or as a storage area which temporarily stores image data.

The CPU 31 stores the processing result in the RAM 33 or the NVRAM 34 according to signals transmitted from various sensors and the control program read from the ROM 32, and controls various elements of the printer 100 through the ASIC 35 (for example, lighting timing of the exposure device 53, drive motors (not shown) of the various rollers constituting the forward conveying path 11 and the reverse conveying path 12, and moving motors (not shown) of an image sensor unit constituting the image reading section 20).

The network interface 36 is connected to a network such as the Internet to enable a communication with an information processing apparatus in which a driver for the printer 100 is installed. A print job can be communicated through the network interface 36.

Double-Sided Copying Process

Next, the double-side copying process in the printer 100 will be described with reference to the flowchart of FIG. 8. The printer 100 performs the double-side copying process in response to receiving a double-side copy instruction which is input through the operation panel 40.

First, a copy setting for the double-side copying is acquired (S101). The copy setting includes, for example, an n-up setting, a reading quality (reading resolution) setting, a double-side reading (reading side) setting, and a color reading setting. The copy setting affects preparation time required to generate the print data.

Next, it is determined whether the reading mode is the flatbed mode (S102). If the reading mode is the flatbed mode (S102: YES), the process proceeds to the operation S105. In the flatbed mode, it is assumed to take time to generate the print data corresponding to one page since the original document is manually set on a sheet by sheet basis. Therefore, it is not so expected that an increase in speed of the printing process is achieved by using a large number of sheets N to be successively printed on the first sides. Additionally, disadvantages may be caused by setting a larger value as the value of N. Accordingly, a same process for a case where the preparation time required to generate the print data is long (S104: NO), that is, the process of determining a smaller value of N is performed.

On the other hand, if the reading mode is not the flatbed mode, that is, if the reading mode is the ADF mode (S102: NO), the preparation time required to generate the print data is estimated (calculated) (S103). Specifically, the printer 100 stores a definition table 321 which includes coefficients for each copy setting and a threshold time as shown in FIG. 9, in a memory (the ROM 32 or the NVRAM 34). Then, by using the definition table 321 and the copy setting acquired in the operation S101, the preparation time required to generate the print data is calculated.

Figure 10:
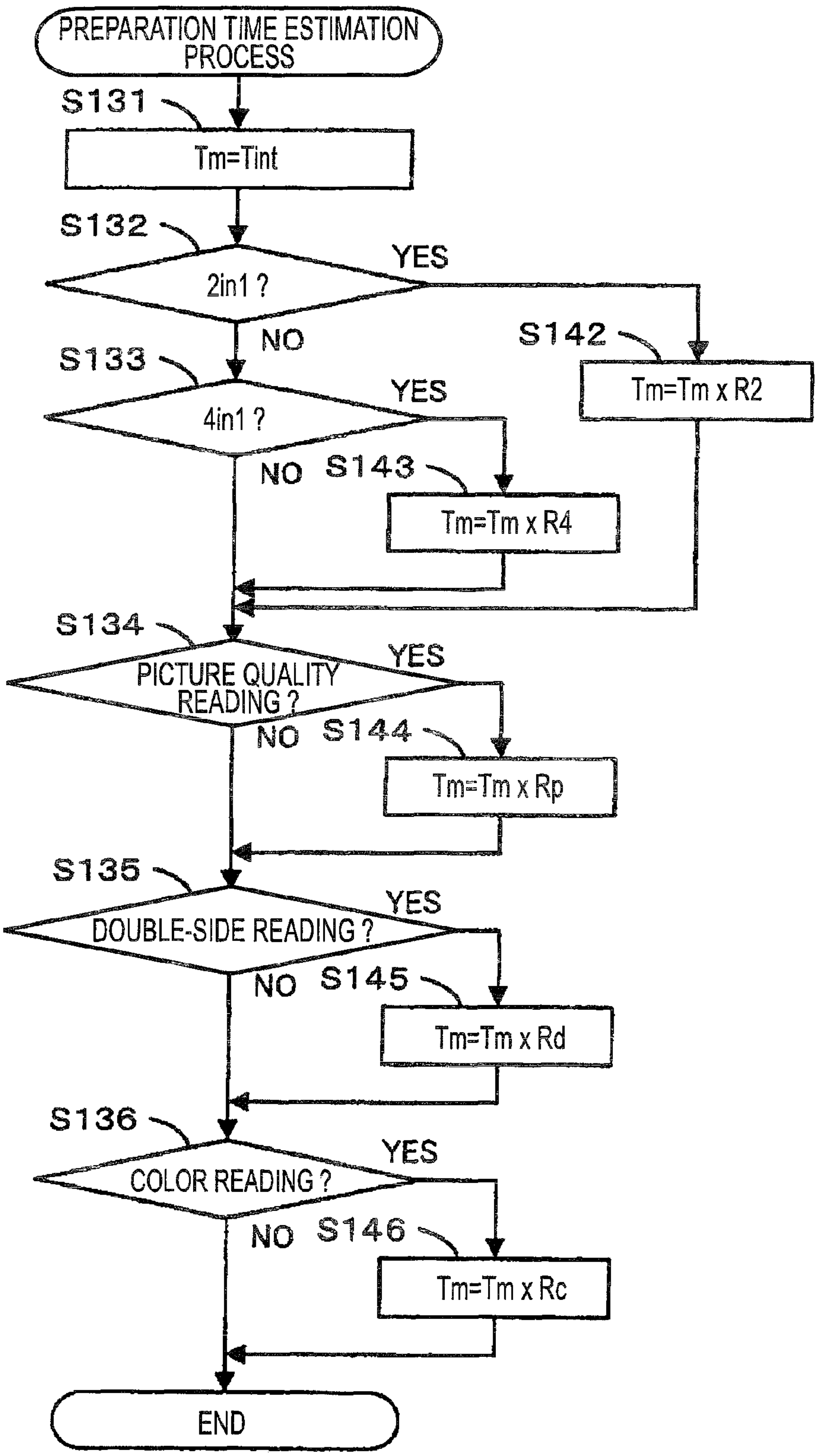
FIG. 10 is a flowchart illustrating a procedure of a preparation time estimation process.

Herein, the preparation time estimation process of the operation S103 will be described with reference to the flowchart of FIG. 10. First, an initial value Tint is substituted for the preparation time Tm (S131). The initial value Tint is stored in the definition table 321 and is read from the definition table 321. It is noted that not only the initial value Tint but also all the various time coefficients used in the preparation time estimation process are stored in the definition table 321 and are read from the definition table 321.

Next, it is determined whether a 2in1 setting for printing two original images on one sheet is made as the n-up setting (S132). If the 2in1 setting is made (S132: YES), the preparation time Tm is multiplied by a time coefficient R2 for the 2in1 reading (S142). If the 2in1 setting is not made (S132: NO), it is determined whether a 4in1 setting for printing four original images on one sheet is made (S133). If the 4in1 setting is made (S133: YES), the preparation time Tm is multiplied by a time coefficient R4 for the 4in1 reading (S143).

Next, it is determined whether a picture quality (high reading resolution) is set as an original document quality setting (S134). If the picture quality is set (S134: YES), the preparation time Tm is multiplied by a time coefficient Rp for the picture quality reading (S144).

Next, it is determined whether the double-side reading is set (S135). If the double-side reading is set (S135: YES), the preparation time Tm is multiplied by a time coefficient Rd for the double-side reading (S145).

Next, it is determined whether a color reading is set (S136). If the color reading is set (S136: YES), the preparation time Tm is multiplied by a time coefficient Rc for the color reading (S146).

As described above, in the preparation time estimation process in the operation S103, the preparation time Tm is multiplied by time coefficients according to the copy setting. Herein, it is noted that, the referred copy settings are not limited to the above. If a certain setting affects the generation time of the print data, more specifically, if a certain setting relates to the image reading time or the memory expansion time of the read data, a time coefficient corresponding to such setting may be multiplied.

Figure 8:
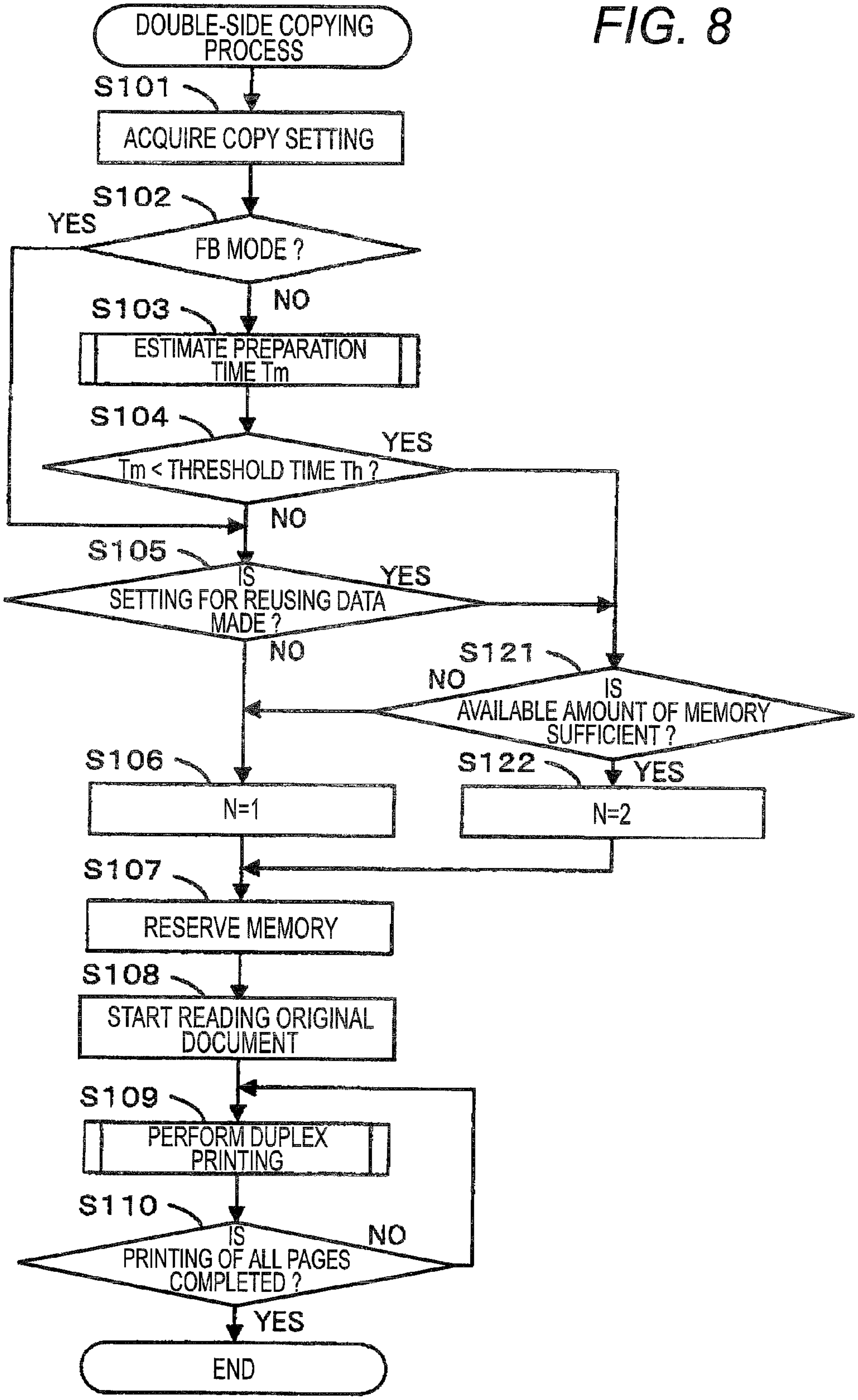
FIG. 8 is a flowchart illustrating a procedure of a double-side copying process.

Returning to the description of the flowchart of FIG. 8, it is determined whether the preparation time Tm acquired in the operation S103 is smaller than a threshold time Th for the case where the value of N is 2 (S104). This threshold time Th is appropriately set based on the relationship between the process time of the printing performed when the value of N is 2 and the process time of the printing performed when the value of N is 1. The threshold time Th is also stored in the definition table 321, and is read from the definition table 321.

If the preparation time Tm is equal to or longer than the threshold time Th (S104: NO), it is determined whether a setting for reusing data as a print setting is made (S105). The setting of reusing data is a setting for reusing the print data without deleting the print data even after the completion of the duplex printing performed on one sheet. The setting of reusing data corresponds to, for example, a sort printing setting or a reprinting setting. If the setting for reusing data is not made (S105: NO), it is determined that the value of N is 1 (S106).

Specifically, when the preparation time Tm is equal to or longer than the threshold time Th, it can be expected that a relatively long time is necessary for the reading of the original document and the memory expansion of data, and it takes time for completing the generation of the print data. Therefore, even though a larger value is set as the value of N, an increase in printing speed is not always expected, and additionally, disadvantages may be caused by setting a larger value as the value of N. Accordingly, the value of N is set to 1.

If the setting for reusing data is made (S105: YES), it is determined whether an available amount of the memory of the printer 100 is sufficient (greater than a value) (S121). If the available amount of the memory is sufficient, N is set to 2 (S122). That is, when the setting for reusing data is made, the print data is not immediately deleted from the memory even after the end of the printing. Therefore, even if the smaller value is set as the value of N, it is not expected to enjoy an effect of avoiding disadvantages caused by the larger value of N, that is, an effect of reducing the amount of the memory used. Accordingly, the larger value is set as the value of N, and priority is given to the increase in speed of the duplex printing process.

In contrast, if the preparation time is shorter than the threshold time Th (S104: YES), it is determined whether an available amount of the memory in the printer 100 is sufficient (S121). If the available amount of the memory is sufficient (S121: YES), it is determined that the value of N is 2 (S122).

That is, if the preparation time Tm is shorter than the threshold time Th, it can be expected that a long time is not necessary for the reading of the original document and the memory expansion of data, and the printing preparation is completed early. Therefore, by setting the value of N to 2, the duplex printing speed is increased.

If the available amount of the memory is not sufficient (S121:NO), it is not possible to perform the operation by setting the value of N to 2, and thus it is determined that the value of N is 1 (S106). That is, when the value of N is set to 2, in order to retry the printing after a paper jam, a larger memory area is necessary as compared with the case where the value of N is set to 1. For example, a memory area for storing the print data corresponding to 4 pages is necessary for the case where the value of N is set to 2. Accordingly, in the operation of S121, it is determined whether the available amount of the memory is sufficient for storing the print data corresponding to 4 pages. The determination as to the available amount of the memory is not limited to the physical memory capacity, and may be made based on whether the memory capacity required to allow the printer 100 to perform another process is reserved.

After the determination of the value of N, the memory area having a size corresponding to the value of N is reserved (S107). In other words, when the value of N is 1, the memory area corresponding to 2 pages is reserved, and when the value of N is 2, the memory area corresponding to 4 pages is reserved. Thereafter, the reading of the original document is started (S108).

Figure 11:
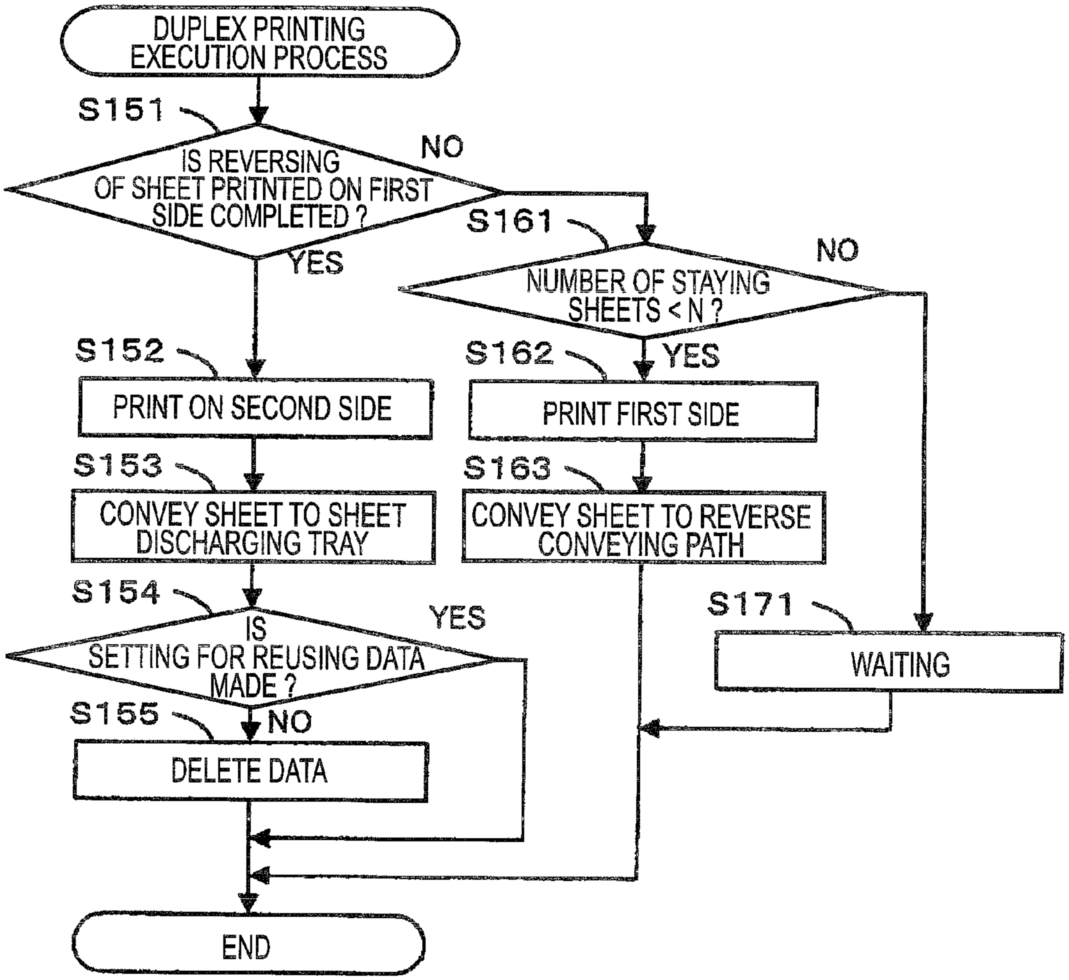
FIG. 11 is a flowchart illustrating a procedure of a duplex printing execution process.

Subsequently, the duplex printing is started (S109). Next, the procedure of the duplex printing execution process will be described with reference to the flowchart of FIG. 11. It is noted that this duplex printing execution process ends when completing single-side printing. That is, the duplex printing is performed by performing this duplex printing execution process at least twice.

First, it is determined whether the reversing of the sheet, on which the first side printing has been performed, is completed and the preparation for conveying the sheet to the processing section 50 is completed (S151). In the operation S151, it is determined that the preparation for conveying the sheet is not completed when the sheet does not stay in the reverse conveying path 12, or when the sheet is positioned at a predetermined distance or more apart from a junction position between the forward conveying path 11 and the reverse conveying path 12 even when the sheet is staying therein.

If the preparation for conveying the sheet is not completed (S151: NO), it is determined whether the number of sheets staying in the reverse conveying path 12 is smaller than N (S161). If the number of sheets is smaller than N (S161: YES), one sheet is fed from the sheet feeding cassette 91, and the sheet is conveyed to the processing section 50, thereby printing the sheet on the first side thereof (S162). Thereafter, the sheet having been printed on the first side is conveyed to the reverse conveying path 12 (S163). If the number of sheets is equal to or greater than N (S161: NO), the number of sheets staying in the reverse conveying path 12 reaches a limit thereof. Therefore, printing is suspended until the sheet in the reverse conveying path 12 is prepared to be returned to the forward conveying path 11 (S171).

If the preparation for conveying the sheet having been printed on the first side is completed (S151: YES), the sheet in the reverse conveying path 12 is conveyed to the processing section 50, and is printed on the second side thereof (S152). Thereafter, the sheet printed on both sides thereof is discharged to the sheet discharging tray 92 (S153).

Next, it is determined whether the setting for reusing the print data is made (S154). If the setting for reusing the data is made (S154: YES), the duplex printing execution process ends without deleting the print data from the memory. In contrast, if the setting for reusing the data is not made (S154: NO), the deletable print data is deleted from the memory (S155). That is, when the print data of the sheet having been printed on both sides thereof remains, the data is deleted. Furthermore, after being deleted, print data of a new page is expanded in the memory. That is, the print data of the sheet having been printed on both sides thereof is deleted immediately after printing, thereby avoiding an increase in memory area used for the print data.

Returning to the description of the printing process of FIG. 8, after the duplex printing execution process of step S109, it is determined whether the printing of all pages is completed (S110). If an unprinted page exists (S110: NO), the process returns to the operation S109, and the next page is printed. If the printing of all the pages is completed (S110: YES), this process ends.

It is noted that, in the above-described double-side copying process, the number of sheets N to be successively printed on the first sides is set to 1 or 2, but the value of N is not limited thereto. That is, in the conveyable range, the value of N may be set to 3 or more. In this case, the threshold times corresponding to the values of N are provided respectively, and the preparation time and the respective threshold times are compared to determine an appropriate value of N.

As described above, the printer 100 according to this illustrative embodiment is capable of performing the duplex printing including printing N sheets on first sides thereof and subsequently printing M sheets (M≤N) on second sides thereof, and is also capable of changing the value of N. In addition, in determining (setting) the value of N, the preparation time required to generate the print data is calculated based on at least a part of the copy setting, and it is determined whether the preparation time is shorter than the threshold time for the value of N. Then, if the preparation time is not shorter than the threshold time (that is, it is expected that the preparation time for printing of the print data is longer), the value of N is set to be smaller in order to perform duplex printing. Accordingly, it can be expected to avoid the temporary suspension due to the waiting for the generation of the print data, and it is possible to start printing early by using the print data in which the print preparation is completed. In addition, when the conveyance of the sheet is suspended because of the temporary suspension at a large value of N, a risk of disadvantages (the amount of the memory used increases, the number of sheets having print failure caused by paper jam increases, and the like) caused by a large value of N is accompanied. However, if the value of N is set to be small, it is possible to avoid such disadvantages. On the other hand, when the preparation time is less than the threshold time (that is, it is expected that it takes less time to prepare the printing of the print data), the duplex printing is performed with a large value of N. Thereby, it is possible to perform printing efficiently. As described above, in the illustrative embodiment, the preparation time required to complete the printing preparation is estimated (calculated) based on the copy setting, and the number of sheets to be printed successively (that is, the number of sheets staying in the reverse conveying path) is changed. Therefore, it is possible to perform printing efficiently while reducing the possibility of the temporary suspension of the printing operation due to the waiting for the generation of the print data.

While the present invention has been shown and described with reference to certain illustrative embodiments thereof, it will be understood by those skilled in the art that various changes in form and details may be made therein without departing from the spirit and scope of the invention as defined by the appended claims.

For example, the present invention is not limited to the color printer, and may be applied to a multi function peripheral, a FAX device, and the like if it has the image forming function. Furthermore, the image formation method of the image forming section is not limited to the electrophotographic method, and may be an inkjet method. In addition, the image forming section may form a color image, or form only a monochrome image.

Further, in the above-described illustrative embodiment, a plurality of sheets are successively printed on first sides thereof, and subsequently the same number of sheets are printed on the second sides thereof. However, after the plurality of sheets are printed on the first sides thereof, printing may be performed alternately on the second sides and on the first sides. For example, when the number of sheets to be successively printed is 2, the first sheet is printed on the second side thereof (step S3), the first sheet is discharged to the sheet discharging tray 92, and the third sheet S3 is conveyed into the forward conveying path 11, and is printed on the first side (step S4'). At this time, the second sheet S2 is staying in the reverse conveying path 12, and is not returned to the forward conveying path 11. Thereafter, the sheet S3 is conveyed into the reverse conveying path 12, and the second sheet S2 is returned to the forward conveying path 11, and is printed on the second side (step S5). Then, steps S4' and S5 are repeated. For example, in a case where four sheets are printed on both sides, the printing is performed in order of the first side of the first sheet, the first side of the second sheet, the second side of the first sheet, the first side of the third sheet, the second side of the second sheet, the first side of the fourth sheet, the second side of the third sheet, and the second side of the fourth sheet. In this conveying order, while the sheet is reversed, another sheet is printed, so that printing efficiency can be improved.

Furthermore, the number of sheets M to be successively printed on the second sides may be equal to or less than the number of sheets N to be successively printed on the first sides. For example, at first, the three sheets may be successively printed on the first sides. Thereafter, the second side printing and the first side printing may be alternately performed by two sheets by two sheets.

Further, in the above-described illustrative embodiment, when the print data is expanded in the memory of the printer 100, each data corresponding to 2N page is sequentially expanded in the memory. This process particularly effective in the case where the memory capacity in the printer 100 is intended to be minimized, but the timing of expanding the print data is not limited thereto. For example, when the printer 100 includes a memory having a capacity capable of expanding the print data corresponding to all pages therein, the print data corresponding to all pages may be expanded at once in the memory.

The present invention provided illustrative, non-limiting embodiments as follows:

(1) An image forming apparatus comprises: a reading section configured to read an original document; a printing section configured to perform duplex printing including printing N sheets on first sides thereof and subsequently printing M sheets on second sides thereof when printing an image of the original document read by the reading section, wherein M is equal to or smaller than N; a determination section configured to calculate a preparation time required to generate print data based on a copy setting which affects the preparation time, and configured to determine the value of N, wherein the determination section determines a smaller value as the value of N, as the preparation time is longer; and a control section configured to control the printing section to perform the duplex printing in accordance with the value of N determined by the determination section.

The above-described image forming apparatus is configured to perform the duplex printing including printing N sheets on first sides thereof and subsequently printing M sheets (M≤N) on second sides thereof, wherein "N" is a positive integer, and "M" is an integer equal to or more than 0 and equal to or less than N. Depending on the value of "N", the number of sheets staying in the apparatus as the standby of the printing on the second sides after the printing of the first sides is determined. The printing section is configured to change the numbers of sheets N and M to be printed on their respective sides in the conveyable range. When determining the value of N, as the preparation time required to generate the print data is longer, the smaller value is determined as the value of N. The "preparation time" is calculated based on the copy setting (a setting relating to the reading time of an image and a setting relating to the memory expansion time of the read data) which affects the generation time of the print data.

That is, when it is expected that relatively long time is required to complete printing preparation in a copy process, the above-described image fowling apparatus performs the duplex printing by setting the value of N, which is the number of sheets to be successively printed on the first sides, to be small. Accordingly, it is possible to avoid the temporary suspension caused by waiting for completion of the printing preparation of the print data, and it can be expected that the printing is started early by using the print data in which the printing preparation is completed. Furthermore, it is possible to avoid disadvantages caused when N is large. In contrast, when it is expected that relatively not long time is required to prepare the printing of the print data, the duplex printing is performed by using the larger value of N. Accordingly, printing efficiently can be improved.

(2) In the above-described image forming apparatus, the determination section may calculate the preparation time based on, among the copy setting, at least one of a reading resolution setting, a reading side setting, a reading color setting, and an n-up setting. By calculating the preparation time based on these copy settings, the preparation time can be accurately calculated (estimated).

(3) The above-described image forming apparatus may further comprise a memory configured to store the print data. The determination section may determine, as the value of N, a value which is smaller than a value to be determined based on the preparation time when an available amount of the memory is smaller than a threshold value. That is, when the available amount of memory is small, the effect on processes other than printing is large if a large amount of memory is used with the larger value of N. Therefore, in order to avoid this situation, the determination section determines a smaller value as the value of N.

(4) The above-described image forming apparatus may further comprise: a memory configured to store the print data; and a deleting section configured to delete, in response to completion of print on the first and second sides of one sheet, the print data corresponding to the one sheet. The completion of the printing may be completion of image formation on the sheet or completion of discharge of the sheet to the outside of the apparatus. By deleting the print data as early as possible, load on other processes can be reduced.

(5) The above-described image forming apparatus may further comprise a setting section capable of making a setting of reusing print data after completion of print of the print data. When the setting of reusing print data is made, the deleting section may not delete the print data even when the print is completed, and the determination section determines, as the value of N, a value which is larger than a value to be determined based on the preparation time. The "setting of reusing the print data" includes, for example, the sort printing setting (which prints a plurality of sheets in the page order) and the reprinting setting (which reuses the print data by which printing is completed). The using of a small value of N is advantageous in, for example, reducing the amount of the memory used, but in the case of reusing the print data, the print data is not deleted, and therefore, this advantage can not be fully enjoyed. Accordingly, the larger N is used, and priority is given to an increase in printing speed.

(6) In the above-descried image forming apparatus, the reading section may have selectable reading modes including at least a first mode of reading an image of the original document while conveying the original document, and second mode of reading an image of the original document placed on a document placing table. The determination section may determine, as the value of N, a value which is smaller than a value to be determined based on the preparation time when the original document is to be read by the reading section in the second mode. In the second mode, it is expected that the reading takes relatively long time. Therefore, it is not expected that an increase in speed of the printing process is achieved by using a large number of sheets N to be successively printed on their first sides. Additionally, there may be a disadvantage caused by using the large value of N. Therefore, it is advantageous to use the small value of N to cause the amount of used memory to be small regardless of the calculation result of the preparation time.

What is claimed is:

1. An image forming apparatus comprising:

a reading section configured to read an original document;

a printing section configured to perform duplex printing including printing N sheets on first sides thereof and subsequently printing M sheets on second sides thereof when printing an image of the original document read by the reading section, wherein M is equal to or smaller than N;

a storage section configured to store therein an initial time, a plurality of time coefficients for respective copy setting items which affect a preparation time required to generate print data, and a threshold value;

a determination section configured to calculate a preparation time required to generate print data by multiplying the initial time by respective time coefficients for copy setting items set as a copy setting, and configured to determine the value of N, wherein before starting the duplex printing, the determination section is configured to determine a first value as the value of N when the preparation time is smaller than the threshold value and determine a second value which is smaller than the first value as the value of N when the preparation time is equal to or larger that the threshold value; and a control section configured to control the printing section to perform the duplex printing in accordance with the value of N which is determined by the determination section before starting the duplex printing.

2. The image forming apparatus according to claim 1, wherein the determination section calculates the preparation time based on, among the copy setting, at least one of a reading resolution setting, a reading side setting, a reading color setting, and an n-up setting.

3. The image forming apparatus according to claim 1, further comprising:

a memory configured to store the print data, wherein when an available amount of the memory is smaller than a threshold value, the determination section determines the second value which is smaller than the first value as the value of N even if the first value is to be determined based on the preparation time.

4. The image forming apparatus according to claim 1, further comprising:

a memory configured to store the print data; and a deleting section configured to delete, in response to completion of print on the first and second sides of one sheet, the print data corresponding to the one sheet.

5. The image forming apparatus according to claim 4, further comprising:

a setting section capable of making a setting of reusing print data after completion of print of the print data, wherein, when the setting of reusing print data is made, the deleting section does not delete the print data even when the print is completed, and wherein when the setting of reusing print data is made, the determination section determines the first value as the value of N even if the second value which is smaller than the first value is to be determined based on the preparation time.

6. The image forming apparatus according to claim 1, wherein the reading section has selectable reading modes including at least a first mode of reading an image of the original document while conveying the original document, and second mode of reading an image of the original document placed on a document placing table, and wherein when the original document is to be read by the reading section in the second mode, the determination section determines the second value which is smaller than the first value, as the value of N, even if the first value is to be determined based on the preparation time.

7. The image forming apparatus according to claim 1, wherein the plurality of coefficients include a coefficient for a 2in1 setting, a coefficient for a 4in1 setting, a coefficient for a photograph reading setting, a coefficient for a double-side reading setting, and a coefficient for a color reading setting, and wherein the determination section configured to calculate the preparation time by multiplying the initial time by coefficients which are set as the copy setting.

8. An image forming apparatus comprising:

a reading section configured to read an original document;

an operation section configured to receive a user input regarding an image reading setting of the reading section;

a printing section configured to perform duplex printing including printing N sheets on first sides thereof and subsequently printing M sheets on second sides thereof when printing an image of the original document read by the reading section, wherein M is equal to or smaller than N;

a storage section configured to store therein an initial time, a plurality of time coefficients for respective reading setting items which affect a reading time for reading the original document, and a threshold value;

a determination section configured to estimate a reading time for reading the original document by multiplying the initial time by respective time coefficients for reading setting items of the image reading setting received by the operation section, and configured to determine, before starting the duplex printing, a first value as the value of N when the estimated reading time is smaller than the threshold value and determine a second value which is smaller than the first value as the value of N when the estimated reading time is equal to or larger than the threshold value; and a control section configured to control the printing section to perform the duplex printing in accordance with the value of N which is determined by the determination section before starting the duplex printing.

9. The image forming apparatus according to claim 8, wherein the plurality of coefficients include a coefficient for a 2in1 setting, a coefficient for a 4in1 setting, a coefficient for a photograph reading setting, a coefficient for a double-side reading setting, and a coefficient for a color reading setting, and wherein the determination section configured to calculate the reading time by multiplying the initial time by coefficients which are set as the image reading setting.

* * * * *